(12) United States Patent
Kato

(10) Patent No.: US 9,081,692 B2
(45) Date of Patent: Jul. 14, 2015

(54) INFORMATION PROCESSING APPARATUS AND METHOD THEREOF

(71) Applicant: CANON KABUSHIKI KAISHA, Tokyo (JP)

(72) Inventor: Hidenori Kato, Kamagaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 14/039,516

(22) Filed: Sep. 27, 2013

(65) Prior Publication Data

US 2014/0122803 A1    May 1, 2014

(30) Foreign Application Priority Data

Oct. 26, 2012  (JP) ................. 2012-237274

(51) Int. Cl.
  *G06F 12/02*   (2006.01)
  *G06F 9/44*    (2006.01)
  *G06F 12/08*   (2006.01)
  *G06F 13/00*   (2006.01)

(52) U.S. Cl.
  CPC .......... *G06F 12/0891* (2013.01); *G06F 9/4418* (2013.01); *G06F 12/0866* (2013.01)

(58) Field of Classification Search
  None
  See application file for complete search history.

(56) References Cited

U.S. PATENT DOCUMENTS

2009/0193189 A1*  7/2009  Carswell et al. .............. 711/113
2013/0097458 A1*  4/2013  Sekino et al. ................. 714/6.3

FOREIGN PATENT DOCUMENTS

JP    2004-362426 A    12/2004
JP    2011-145933 A    7/2011

* cited by examiner

*Primary Examiner* — Scott Sun
(74) *Attorney, Agent, or Firm* — Fitzpatrick, Cella, Harper & Scinto

(57) ABSTRACT

Data representing the storage state of the main memory of an information processing device is saved in a secondary storage device. The data saved in the secondary storage device is transferred to the main memory in reactivation of the information processing device to restore the storage state of the main memory. A cache allocated in the main memory is deallocated before generating data to be saved.

17 Claims, 19 Drawing Sheets

FIG. 6A

| HEADER | | |
|---|---|---|
| MEMBER NAME | MEANING | SIZE(byte) |
| h_id | "snapshot-image" | 32 |
| h_arch | CPU ARCHITECTURE TYPE | 4 |
| h_totalsize | TOTAL SIZE OF SNAPSHOT | 4 |
| h_pages | TOTAL PAGE COUNT | 4 |
| h_pagesize | PAGE SIZE | 4 |
| h_compress | COMPRESSION FLAG | 4 |
| h_encrypt | ENCRYPTION FLAG | 4 |
| h_reg_offset | OFFSET FROM START TO REGISTER INFORMATION | 4 |
| h_meta_offset | OFFSET FROM START TO PAGE META-INFORMATION | 4 |
| h_page_offset | OFFSET FROM START TO PAGE DATA | 4 |

FIG. 6B

| REGISTER INFORMATION | |
|---|---|
| MEMBER NAME | MEANING |
| reg_r0, reg_r1, ..., reg_15 | GENERAL-PURPOSE REGISTERS r0, r1, ..., r15 |
| reg_flags | FLAG REGISTER |
| reg_pc | PROGRAM COUNTER |
| reg_stack | STACK POINTER |

FIG. 6C

| PAGE METADATA | |
|---|---|
| MEMBER NAME | MEANING |
| p_address | PHYSICAL ADDRESS OF PAGE IN MAIN MEMORY |
| p_count | SUCCESSIVE PAGE COUNT |

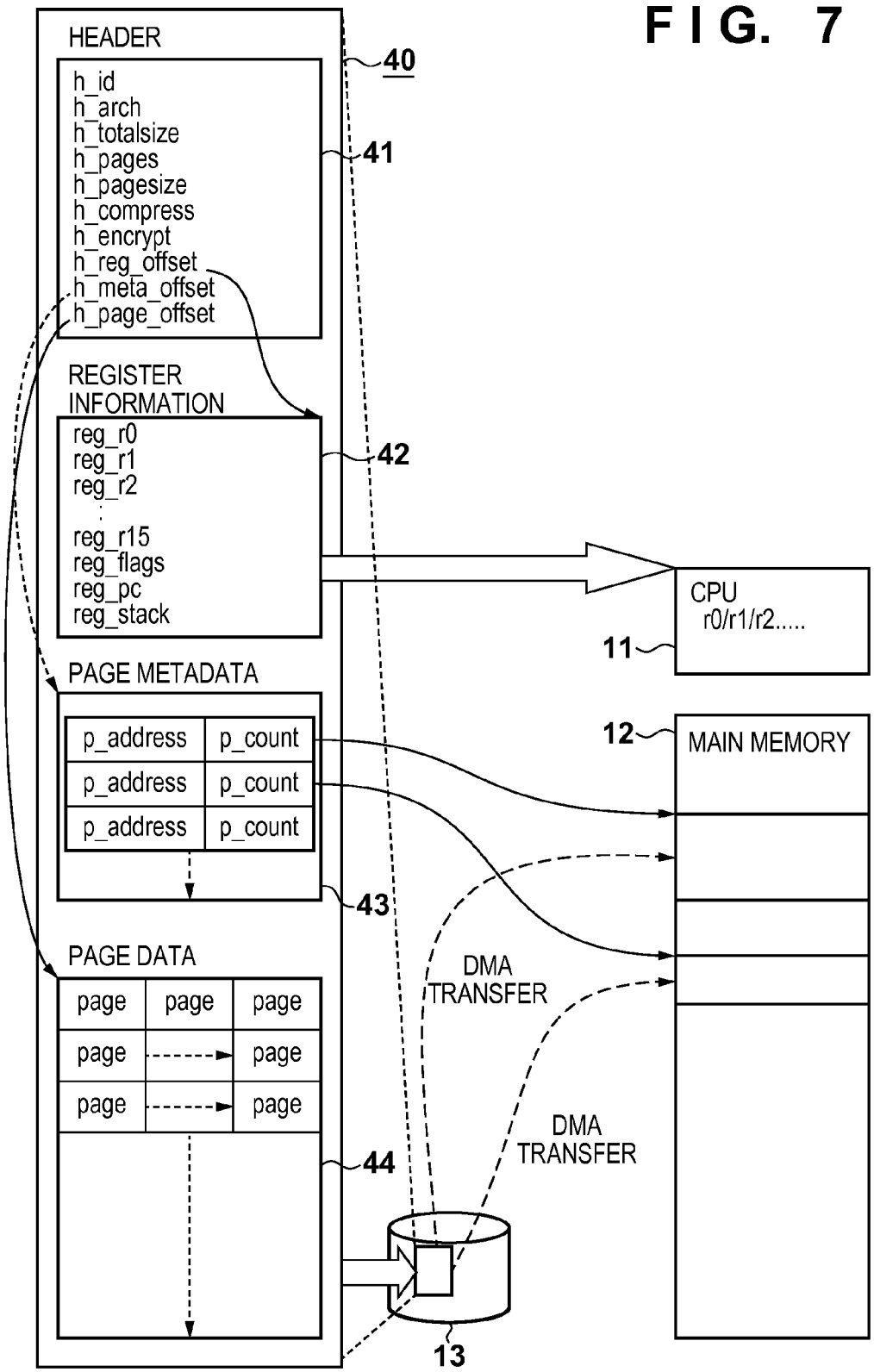
F I G. 7

FIG. 10A

PROCESS MANAGEMENT STRUCTURE

| MEMBER | MEANING |
|---|---|
| p_inode | POINTER TO FILE inode OPENED BY PROCESS |
| nice | PRIORITY OF PROCESS |
| no_free_cache | HIBERNATION PAGE DEALLOCATION FLAG |

FIG. 10B

PAGE MANAGEMENT UNIT

| FUNCTION | CONTENTS |
|---|---|
| PAGE ALLOCATION PROCESS | ONE PAGE IS ENSURED AND ALLOCATED |
| PAGE SEARCH PROCESS | ALLOCATED PAGES ARE SEARCHED FOR TARGET PAGE AND SEARCH RESULT IS SENT BACK |
| PAGE RECLAIMING PROCESS | UNNECESSARY PAGE IS DEALLOCATED |
| ACCESS HISTORY MANAGEMENT | PAGE ACCESS HISTORY IS STORED |

FIG. 10C

PAGE MANAGEMENT STRUCTURE

| MEMBER | APPLICATION PURPOSE |
|---|---|
| ref_count | REFERENCE COUNT (ref_count > 1 WHEN PAGE IS REFERRED TO FROM PLURALITY OF PROCESSES) |
| p_process | POINTER TO PROCESS MANAGEMENT STRUCTURE OF PROCESS HOLDING PAGE |
| p_inode | POINTER TO inode INFORMATION USING PAGE |
| page | POINTER TO PAGE DATA BODY |
| link | POINTER TO LINK PAGE TO LRU LIST |

F I G. 12

| MEMBER NAME | HIBERNATION/PAGE CONTROL INFORMATION |
| --- | --- |
| | MEANING |
| page_nofree_process | PAGE OF DESIGNATED PROCESS IS NOT DEALLOCATED |
| page_nofree_nice | PAGE OF PROCESS HAVING PRIORITY EQUAL TO OR HIGHER THAN THIS PRIORITY IS NOT DEALLOCATED |
| page_nofree_active | PAGE OF PROCESS WAITING FOR EXECUTION IS NOT DEALLOCATED |
| page_nofree_realtime | PAGE OF REAL-TIME PROCESS IS NOT DEALLOCATED |
| page_nofree_ui | PAGE OF INTERACTIVE PROCESS IS NOT DEALLOCATED |
| page_nofree_ref | PAGE REFERRED TO FROM PLURALITY OF PROCESSES IS NOT DEALLOCATED |
| page_total | PAGE CACHE IS HELD UP TO THIS VALUE, AND PART EXCEEDING THIS VALUE IS DEALLOCATED |
| file | PAGE REGARDING FILE REGISTERED IN LIST INDICATED BY TILE IS NOT DEALLOCATED |

INFORMATION PROCESSING APPARATUS AND METHOD THEREOF

BACKGROUND OF THE INVENTION

1. Field of the Invention

The present invention relates to hibernation of an information processing apparatus.

2. Description of the Related Art

A method for shortening the activation time of an information processing apparatus is hibernation. The hibernation is a function of saving, in a nonvolatile memory such as a hard disk, the storage state of a main memory immediately before turning off the computer, and upon turning on the computer, returning the saved storage contents to the main memory so that work can be resumed from a state immediately before turning off the computer.

The hibernation will be explained in detail. A memory image during the operation of the computer and the set values of various hardware registers are saved as a data file in a secondary storage. This data file is called a snapshot image or hibernation image. When the computer is reactivated, the snapshot image is loaded into the main memory to restore the set values of the hardware registers. By the hibernation, construction of a page table in reactivation of the system, and a boot-up process for various services (resident programs) are skipped.

As a technique for speeding up activation using hibernation, there are techniques disclosed in Japanese Patent Laid-Open Nos. 2011-145933 (literature 1) and 2004-362426 (literature 2).

In the technique disclosed in literature 1, a priority flag is set for a memory area. After the memory area for which the priority flag is set is preferentially restored, the system is reactivated. A memory area for which no priority flag is set is restored gradually after reactivation.

In the technique disclosed in literature 2, volatile and nonvolatile memories are arranged as the main memory. A page having low priority in the nonvolatile memory is saved in a secondary storage, and a page having high priority in the volatile memory is saved in the nonvolatile memory. In reactivation, a restoration process is performed using the information saved in the nonvolatile memory.

To further speed up the activation process using hibernation, it is important to reduce the data size of a snapshot image. As a method of reducing the data size of a snapshot image, it is conceivable to clear a cache area allocated in the main memory before creating a snapshot image, and swap out a swapping target area allocated to the main memory.

However, if all caches have been cleared after reactivation or a memory area being used by a process has been swapped out, the throughput (processing ability per unit time) may greatly decrease for a while.

SUMMARY OF THE INVENTION

In one aspect, an information processing apparatus comprises: a saving unit configured to save, in a secondary storage device, data representing a storage state of a main memory of an information processing device; a recovery unit configured to transfer the data saved in the secondary storage device to the main memory in reactivation of the information processing device to restore the storage state of the main memory; and a deallocation unit configured to deallocate a cache allocated in the main memory before generating data to be saved by the saving unit.

According to the aspect, speed-up of reactivation of an information processing apparatus is attained.

Further features of the present invention will become apparent from the following description of exemplary embodiments with reference to the attached drawings.

BRIEF DESCRIPTION OF THE DRAWINGS

FIGS. 6A to 6C are tables for explaining details of structure members contained in the respective elements of the snapshot image.

FIG. 7 is a view for explaining a mechanism of restoring the system in reactivation by using the snapshot image.

FIGS. 10A to 10C are tables for explaining details of the structure members of a process management unit and the functions and structure members of a memory management unit.

FIG. 12 is a graph for explaining the members of the hibernation/page control information.

DESCRIPTION OF THE EMBODIMENTS

An information process according to an embodiment of the present invention will now be described in detail with reference to the accompanying drawings.

[Relationship between Snapshot Image and Speed-Up of Activation]

Almost 90% of the activation time in the use of hibernation is the time taken to transfer a snapshot image from a secondary storage device to a main memory. By reducing the data size of a snapshot image, activation of the computer can be speeded up.

As a method of reducing the data size of a snapshot image corresponding to the storage state of the main memory in the operating state, it is effective to clear a cache in the main memory when acquiring a snapshot image. This is because an operating system (OS) employed as an advanced operating system builds many caches associated with a file (for example, page cache, buffer cache, index node (inode) cache, and directory entry cache). These caches effectively increase the throughput in the operating state of the system, but increase the memory usage rate and increase the data size of a snapshot image.

Considering this, activation of a computer device suffering the problem of the activation time can be further speeded up by clearing the cache before a snapshot image is acquired, and reducing the data size of the snapshot image to suppress the data transfer amount in reactivation.

Another method is deallocation of a swappable memory area allocated to the main memory, in addition to the cache. The swappable memory area includes various memory areas which are allocated to processes and are not associated with a file. In many cases, these memory areas are used as anonymous pages and shared memories.

The swappable memory area cannot be simply deallocated, unlike the cache, but can be saved (swapped out) to a separately prepared swap area to deallocate the memory area as a free memory. Therefore, the activation can be further speeded up by swapping out and deallocating a swappable memory area before a snapshot image is acquired, and reducing the data size of the snapshot image to suppress the data transfer amount in reactivation.

[Apparatus Arrangement]

Figure 1:
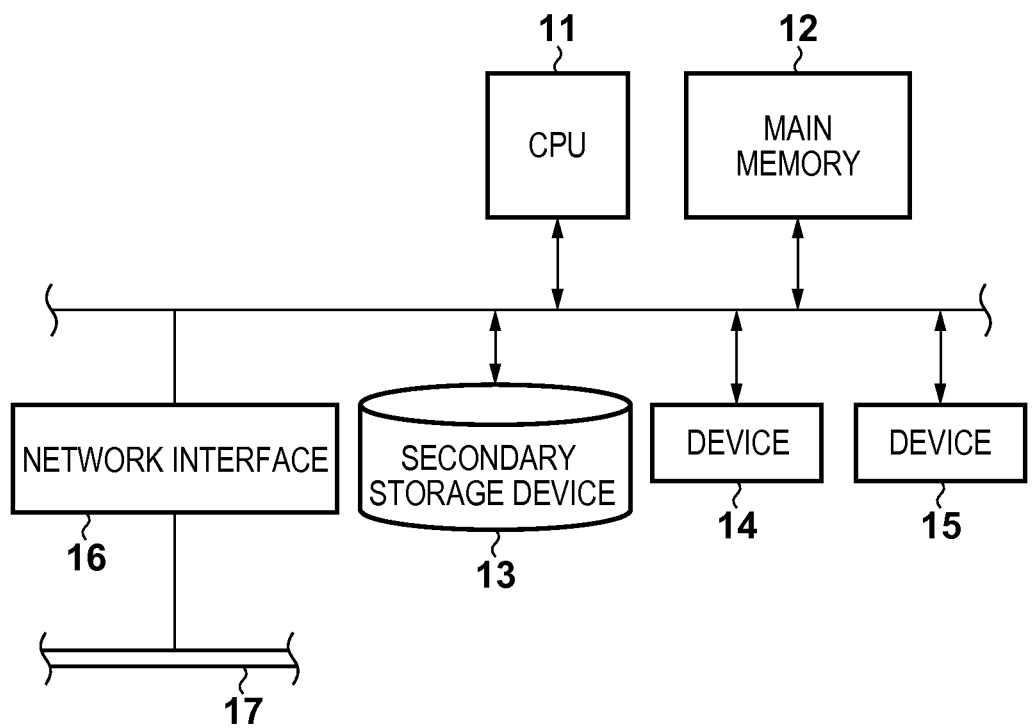
FIG. 1 is a block diagram showing the arrangement of an information processing apparatus according to an embodiment.

The arrangement of the information processing apparatus according to the embodiment is shown in the block diagram of FIG. 1.

In FIG. 1, a microprocessor (CPU) 11 manages almost the overall information processing apparatus. A main memory 12 is a random access memory (RAM) accessible from the CPU 11. A secondary storage device 13 is, for example, a hard disk drive (HDD) or flash memory. Devices 14 and 15 include various devices connected to the information processing apparatus, such as a keyboard, mouse, USB (Universal Serial Bus) device, and display. A network interface 16 is an interface for connecting the information processing apparatus to a network 17. As the network 17, a wired network, wireless network, the Internet, and the like are available.

The secondary storage device 13 is generally used to store a snapshot image. Instead, a server apparatus connected to the network 17 may store a snapshot image.

[Activation Sequence]

Figure 2:
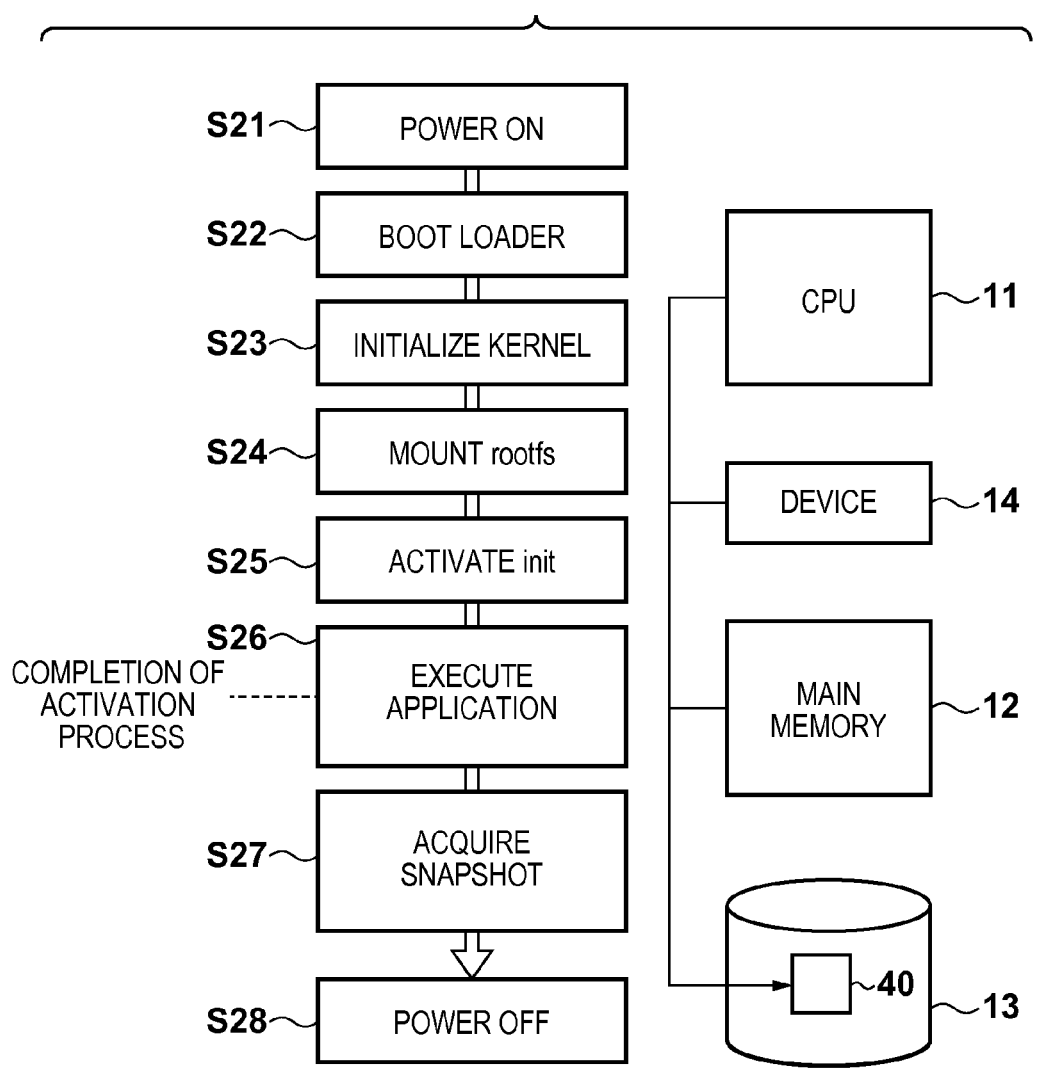
FIG. 2 is a view for explaining a sequence up to acquisition of a snapshot image from a normal activation sequence in the information processing apparatus according to the embodiment.

A sequence up to acquisition of a snapshot image 40 from a normal activation sequence in the information processing apparatus according to the embodiment will be explained with reference to FIG. 2.

In normal activation using no hibernation, if the information processing apparatus is turned on (S21), the activation process is completed through loading of an OS by a normal boot loader (S22), initialization of a kernel (S23), mounting of a file system rootfs (S24), activation of a daemon process init (S25), and execution of an application program (S26). The activation process takes 30 sec to 1 min in many cases and sometimes takes several minutes though it depends on the system configuration.

Acquisition of the snapshot image 40 is executed at the stage of executing the application program. After the start of acquiring the snapshot image 40 (S27), the storage contents of the main memory 12, hardware register, CPU register are saved as the snapshot image 40 in the secondary storage device 13. Then, the information processing apparatus is turned off (S28).

Figure 3:
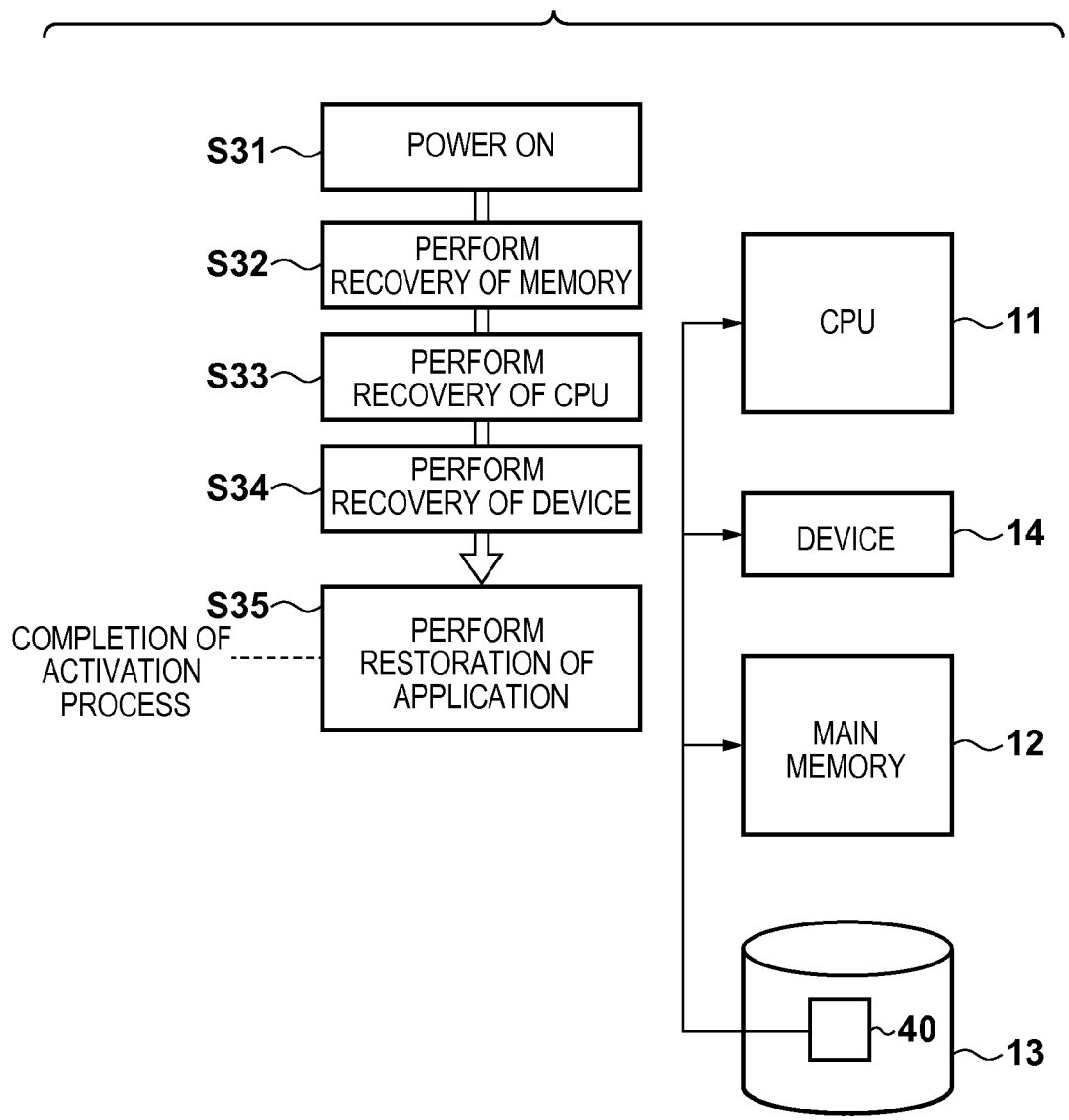
FIG. 3 is a view for explaining an activation sequence using hibernation in the information processing apparatus according to the embodiment.

An activation sequence using hibernation in the information processing apparatus according to the embodiment will be explained with reference to FIG. 3.

In activation using hibernation, if the information processing apparatus is turned on (S31), data saved as the snapshot image 40 is restored in the main memory 12 (S32). Then, the information processing apparatus returns to a state during the previous operation through recovery of the register value of the CPU (S33), recovery of the register value of the device (S34), and restoration of the application (S35). Unlike the normal activation process, the activation process using hibernation ends within several sec though it depends on the system configuration. The information processing apparatus can quickly return to the operating state.

Figure 4:
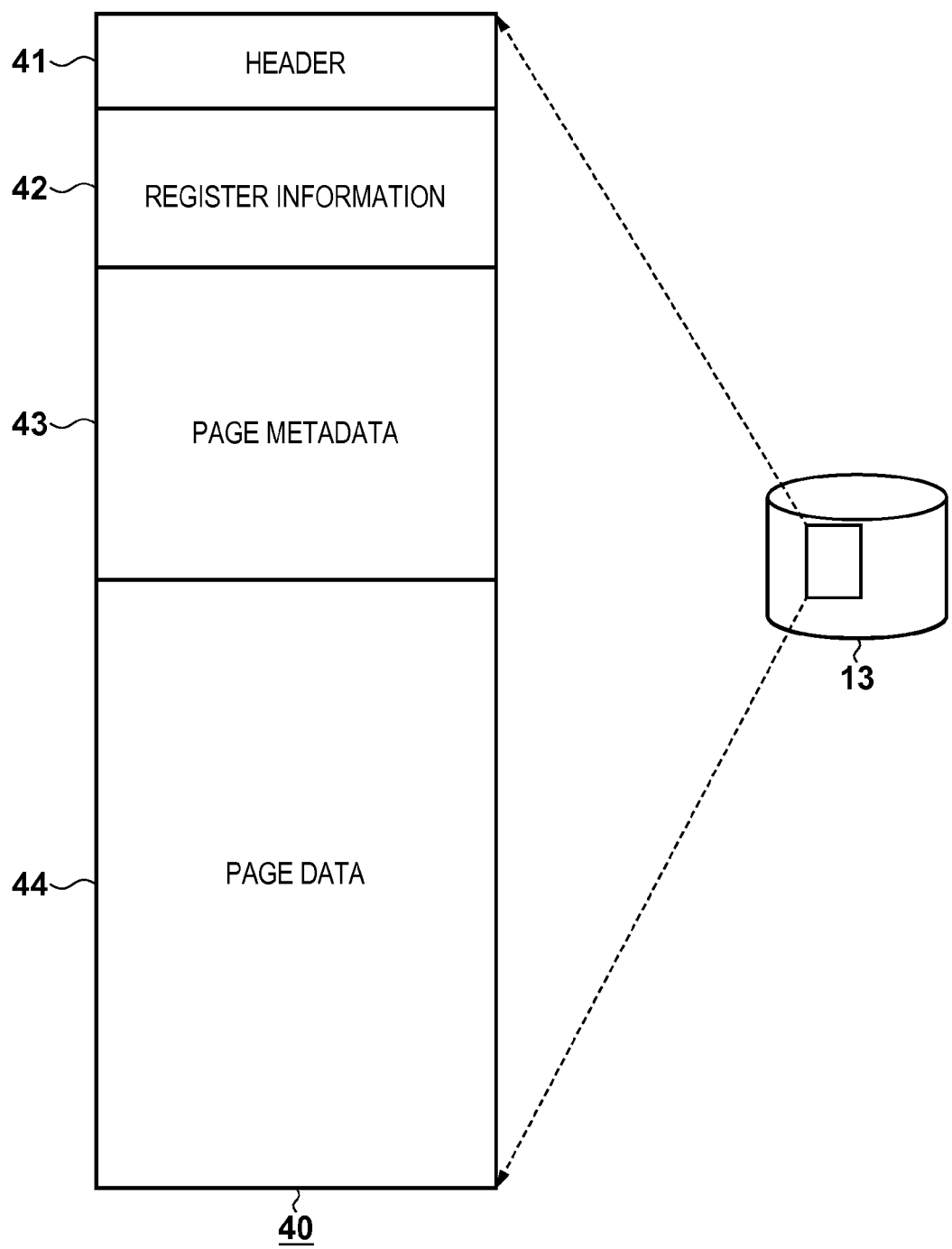
FIG. 4 is a view showing an outline of the format of the snapshot image.

An outline of the format of the snapshot image 40 is shown in FIG. 4. The format shown in FIG. 4 is merely one format when practicing activation using hibernation. The format sometimes changes depending on the hardware configuration or a software factor. The snapshot image 40 includes the blocks of a header 41, register information 42, page metadata 43, and page data 44.

Figure 5:
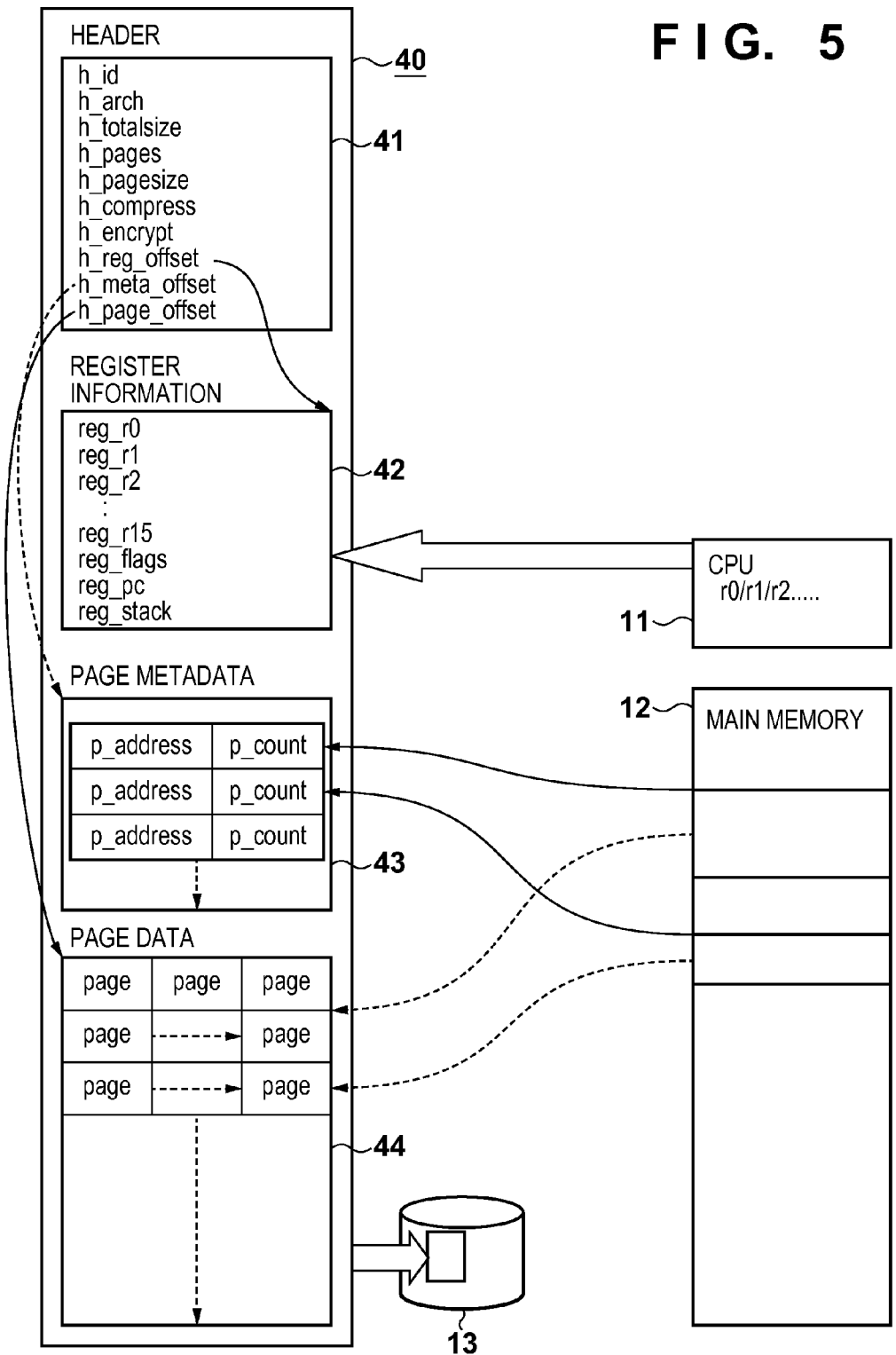
FIG. 5 is a view for explaining details of the respective elements of the snapshot image.

Details of the respective elements of the snapshot image 40 will be explained with reference to FIG. 5. Details of structure members contained in the respective elements of the snapshot image 40 will be explained with reference to FIGS. 6A to 6C.

FIG. 6A shows details of structure members contained in the header 41. The embodiment assumes 32-bit hardware, so many members are declared by 4 bytes=32 bits, as shown in FIG. 6A. However, there is a proper size in a 64- or 128-bit environment, and the size is appropriately changed in accordance with the implementation environment.

FIG. 6B shows details of structure members contained in the register information 42. In the embodiment, the register information 42 assumes a 32-bit CPU having 16 32-bit general-purpose registers r0 to r15, a flag register, a program counter, and a stack pointer (to be referred to as a CPU register hereinafter) though it depends on the system. The value of the CPU register that is saved in the register information 42 is set again in the CPU 11 in reactivation of the system, and the information processing apparatus returns to a state during the operation.

FIG. 6C shows details of structure members contained in the page metadata 43. The page metadata 43 holds the physical addresses of page data (to be described later) in the main memory 12 and a successive page count. The page metadata 43 are arranged in ascending order from a lower address to upper address of the main memory 12, and are in one-to-one correspondence with the alignment of the page data 44.

The page data 44 are data of pages not deallocated in the main memory 12 in a process of acquiring the snapshot image 40. As described in the description of the page metadata 43, the page data 44 are arranged in ascending order from a lower address to upper address. Depending on the implementation, the page data 44 may be compressed or encrypted. In this case, values representing the compression format and encryption type are set in h_compress and h_encrypt serving as members of the header 41, and referred to in recovery of page data in a process at the time of reactivation. Note that data may be compressed and encrypted by software or dedicated hardware.

A mechanism of restoring the system in reactivation by using the snapshot image 40 will be explained with reference to FIG. 7.

In an activation process at the time of reactivation, first, the header 41 of the snapshot image 40 is read out from the secondary storage device 13. Then, the h_id member at the start of the header 41 is checked. If the h_id member contains a character string representing the snapshot image, an activation process using the snapshot image 40 is executed. In this case, the page data 44 is (if necessary, decompressed and decoded) transferred to the main memory 12 by direct memory access (DMA) transfer in accordance with the page metadata 43 of the snapshot image 40. After the end of transferring the page data 44, the CPU register is restored in accordance with the register information 42, the register value of the device is restored, and the information processing apparatus returns to a state during the operation.

[Memory Management/Page Management]

Figure 8:
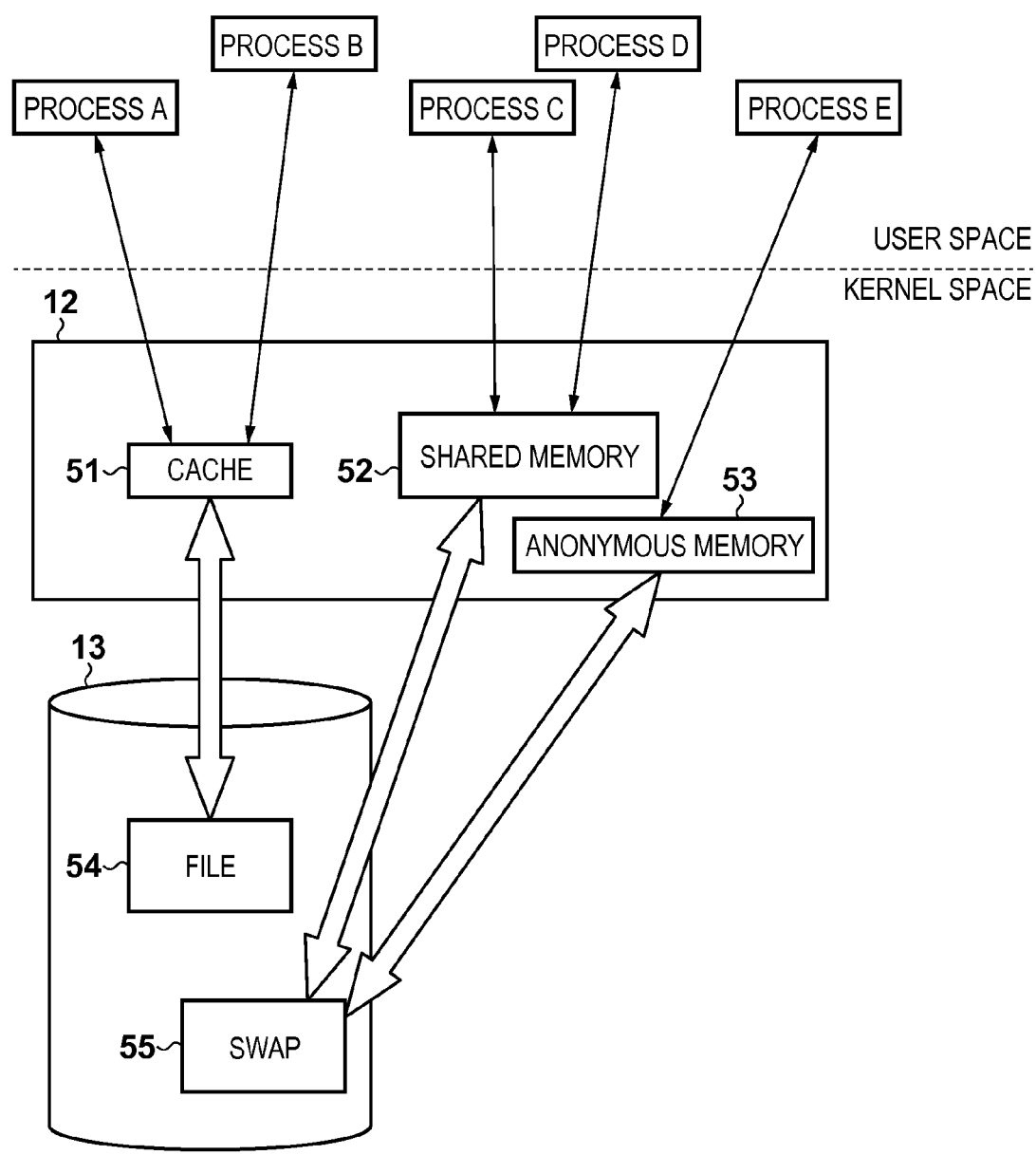
FIG. 8 is a view for explaining the concept of memory management/page management.

The concept of memory management/page management will be explained with reference to FIG. 8.

A cache 51 is allocated in the main memory 12. When a virtual storage unit is implemented in the OS, the cache 51 is prepared for each page (4 KB in many cases), and generally called a "page cache".

Upon receiving a file input/output (IO) request from the process, the OS first searches for the page cache 51, and if the page cache 51 exists, returns information about it. If the page cache 51 does not exist, the OS reads out data from the secondary storage device 13, refills the page cache 51, and after the end of refilling the page cache 51, returns the result to the process. If a request size from the process is equal to or smaller than the page size, this work is performed only once. However, if the request size is equal to or larger than the page size, the work is executed by the excess (request size/page size+1).

The OS performs read/write of a file 54 stored in the secondary storage device 13 in accordance with a request from each process. As a result, the page cache 51 also holds the same contents, and the throughput is increased by using the page cache 51 for the second and subsequent accesses.

A shared memory 52 and anonymous memory 53 are allocated in the main memory 12. The OS also allocates these memory areas for each page (4 KB in many cases). However, unlike the normal page cache 51, the shared memory 52 and anonymous memory 53 are not associated with a file.

When the free memory of the system runs short, the OS executes a page reclaiming process to save pages allocated to the shared memory 52 and anonymous memory 53 to a swap 55, deallocate these pages, and add them to the free area of the system. Unlike the page cache 51, the memory areas of the shared memory 52 and anonymous memory 53 are pages called "dirty pages" having data which need to be written back to the file system, and cannot be simply deallocated by a memory reclaiming process by the OS. For this reason, the deallocation of the shared memory 52 and anonymous memory 53 is always accompanied by write-out to the swap 55, and is a process requiring a high process cost.

The page cache 51 for a file is a page called a "clean page" which is not dirty as long as a file is read out, and can be simply deallocated by the memory reclaiming process. Thus, the deallocation of the page cache 51 is a lower-cost process.

The mechanism of memory management/page management by the OS will be explained with reference to FIG. 9. The OS includes a plurality of management units for managing various resources. The management units used in the embodiment are three, process management unit, file management unit, and memory management unit. Detailed examples of the structure members of the process management unit and the functions and structure members of the memory management unit will be explained with reference to FIGS. 10A to 10C.

A process management unit 61 takes on all the management regarding processes, and allocates a process management structure 61-1 to each process for process management. FIG. 10A shows a detailed example of structure members which are contained in the process management structure 61-1 and hold detailed information of respective processes.

A file management unit 62 unitarily manages files in the system, and generally uses an inode for managing each file. The pointer p_inode of the process management structure 61-1 of the process management unit 61 holds the inode of a file accessed by each process. The pointer p_inode indicates inode information 62-1 of the file management unit 62.

The inode information 62-1 is a basic structure which holds various kinds of information of a corresponding file and is used for a file access. The file management unit 62 performs various file operations based on the inode information.

A memory management unit 63 manages the main memory 12 for each page. In this case, assume that the memory management unit 63 performs memory management using a virtual storage unit for each page, and includes various cache management units. FIG. 10B shows the function of a page management unit 63-2.

The page management unit 63-2 uses a page management structure 63-3 for each page for the purpose of page management. The page management structure 63-3 contains many members for cache control. FIG. 10C shows the members of the page management structure 63-3 used in the embodiment.

In the page management structure 63-3, the page management unit 63-2 updates a reference count ref_count every time the number of processes referring to the target page increases. A page accessed by a plurality of processes can be specified based on the reference count ref_count.

A pointer p_process is a pointer to the process management structure 61-1 of a process holding the target page. A process can be specified from a page based on the pointer p_process. Note that the value of the pointer p_process is sometimes NULL.

A pointer p_inode is set when the target page is used as a file cache. In this case, the pointer p_inode indicates inode information of this file. Note that the value of the pointer p_inode is sometimes NULL.

A pointer link is a link pointer to an LRU (Least Recently Used) list structure in which pages in the system are arranged in the order of access frequency. An LRU list 63-4 is managed so that pages are arranged in descending order of the access frequency. A page having a low access frequency serves as a deallocation target when the memory runs short. Also, in a snapshot image creation process according to the embodiment, the LRU list 63-4 is scanned in ascending order of the access frequency to select a page to be deallocated.

File Access

Figure 9:
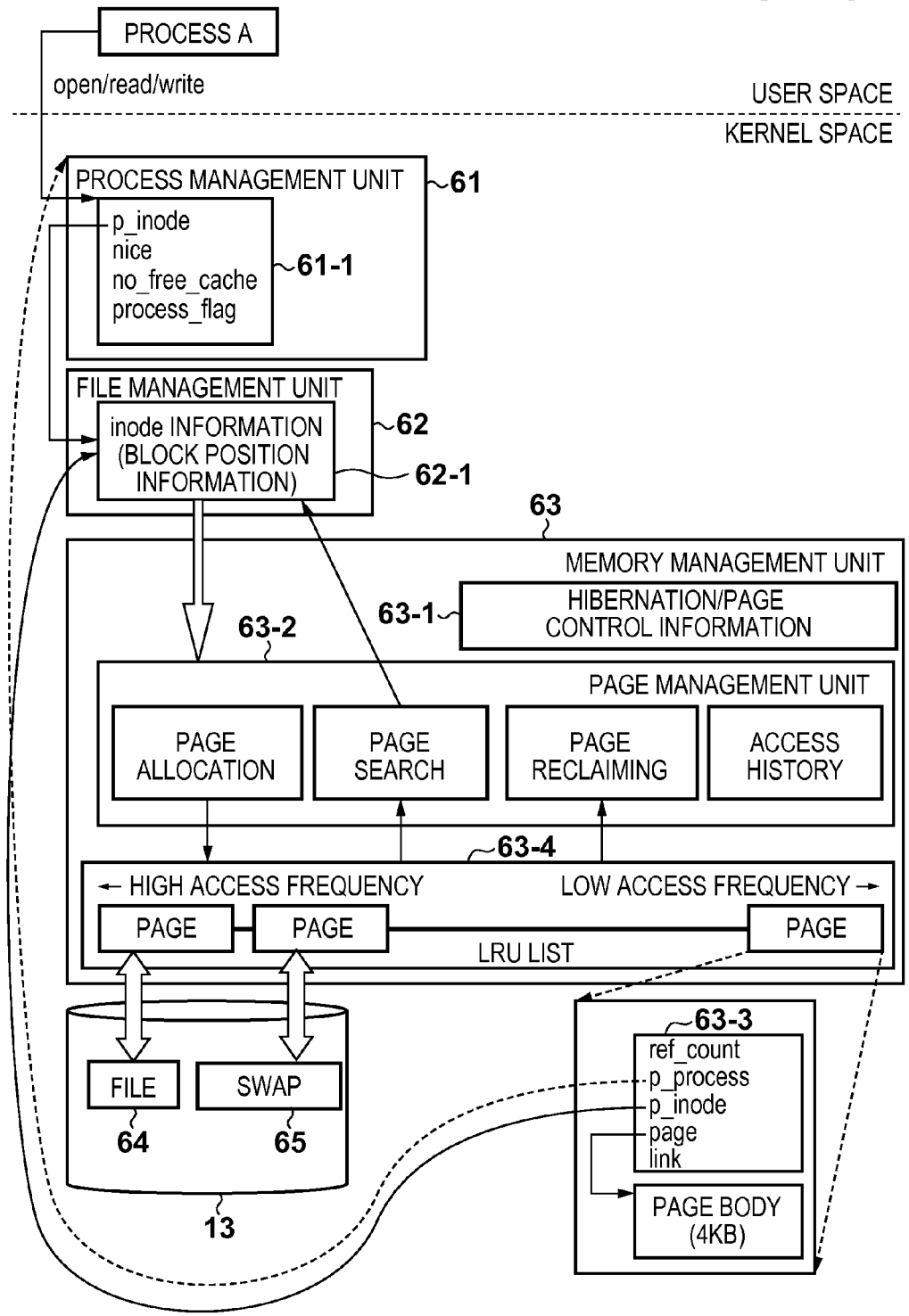
FIG. 9 is a view for explaining in more detail the mechanism of memory management/page management by the OS.

In FIG. 9, assume that there is a read request from process A for a file 64 stored in the secondary storage device 13. In this case, a file access is implemented by the following process.

First, the OS extracts the inode information 62-1 of the target file in response to the request from process A. After the inode information is determined, the file management unit 62 transfers the inode information 62-1 to the memory management unit 63, and requests search for a page corresponding to the inode information 62-1.

To search whether the requested file has already been cached, the memory management unit 63 executes page search using the page management unit 63-2 of the memory management unit 63 itself. The page management unit 63-2 searches pages under management, and if there is a page corresponding to the inode information 62-1, sends back the information. Since an access to the page has occurred, the memory management unit 63 updates the LRU list 63-4 and moves the page to a high-access-frequency position.

If a page corresponding to the inode information 62-1 does not exist in the page cache, the memory management unit 63 allocates, to the main memory 12, a page to be used for the cache, and writes data of the file 64 in the page via the device driver. The cache is therefore refilled, and the memory management unit 63 sends back the result. Further, the memory management unit 63 adds the page of the generated page cache to the LRU list 63-4. When an access request to the file 64 is received later, it suffices to return only information of the page, increasing the access speed.

In addition to the above-mentioned page management, the page management unit 63-2 also manages deallocation of a page and the reference count of a page. Deallocation of a page is a process invoked from the high-order file management unit 62 or another unit of the OS in order to delete an unnecessary page cache or the page cache of a deleted file.

Various methods are proposed for management of the LRU list 63-4, and a mechanism of moving, to a low-access-frequency position, a page which has not been accessed for a predetermined time may be adopted. When the MMU (Memory Management Unit) of the CPU 11 has a reference history bit for each page, the LRU list 63-4 can be maintained in an optimum state based on this information. When the memory usage increases to decrease the free memory, the OS uses these mechanisms to perform a process of deallocating a low-access-frequency page in the LRU list 63-4 and maintain the free memory of the system. The cache is maintained using the above-described mechanism of the cache management unit.

Note that the outline of cache control has been described by exemplifying a general UNIX® OS. Depending on the OS implementation, page management slightly different from the above-described one is performed. However, the present invention aims at deallocating a low-priority page held by a process by using the page management unit, and details of the page management logic is not the gist of the present invention.

Designation of Page Deallocation Behavior

Figure 11:
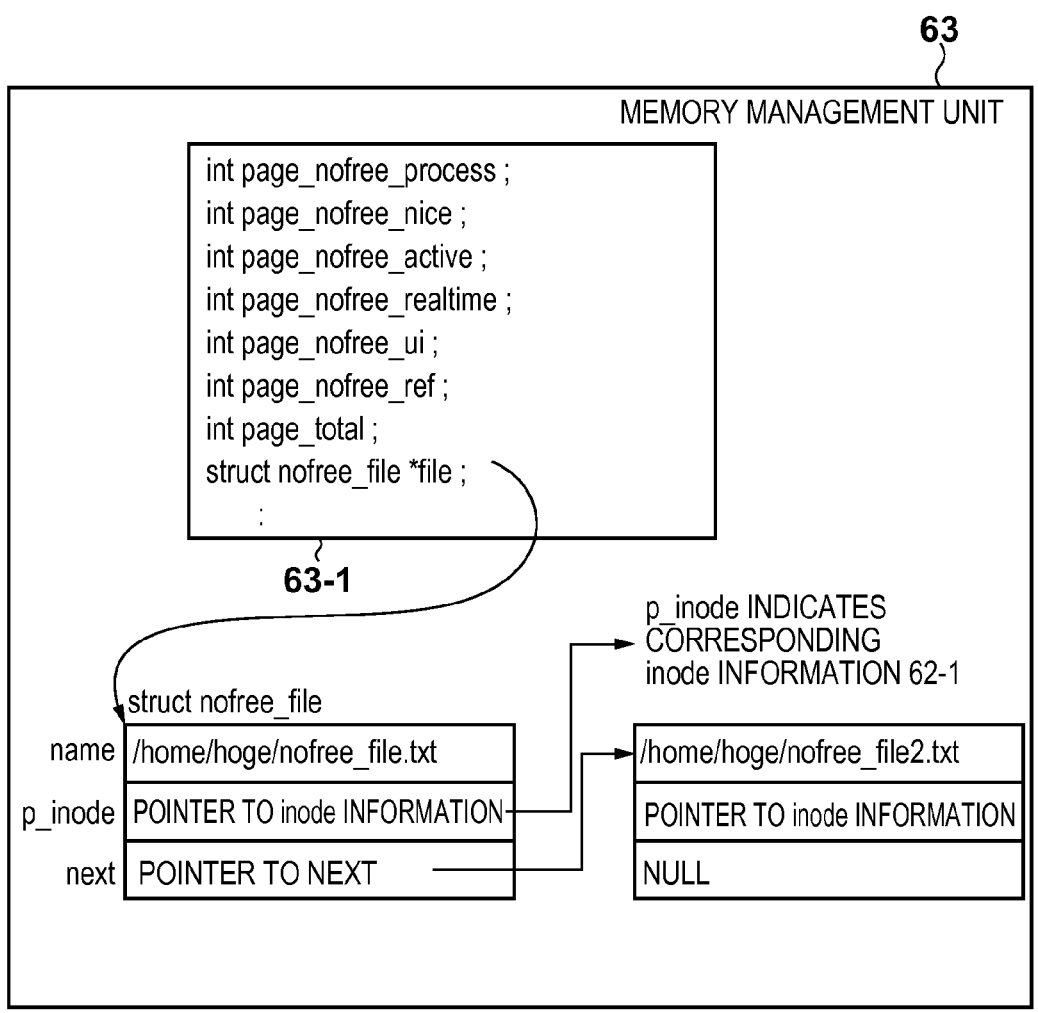
FIG. 11 is a view showing details of hibernation/page control information.

Hibernation/page control information 63-1 shown in FIG. 9 is information for performing page control in the embodiment. FIG. 11 shows details of the hibernation/page control information 63-1. The members of the hibernation/page control information 63-1 will be explained with reference to FIG. 12. Note that flags and variables serving as members of the hibernation/page control information 63-1 are cleared to zero in activation of the system, and then changed in accordance with a system call and the like.

Figure 13:
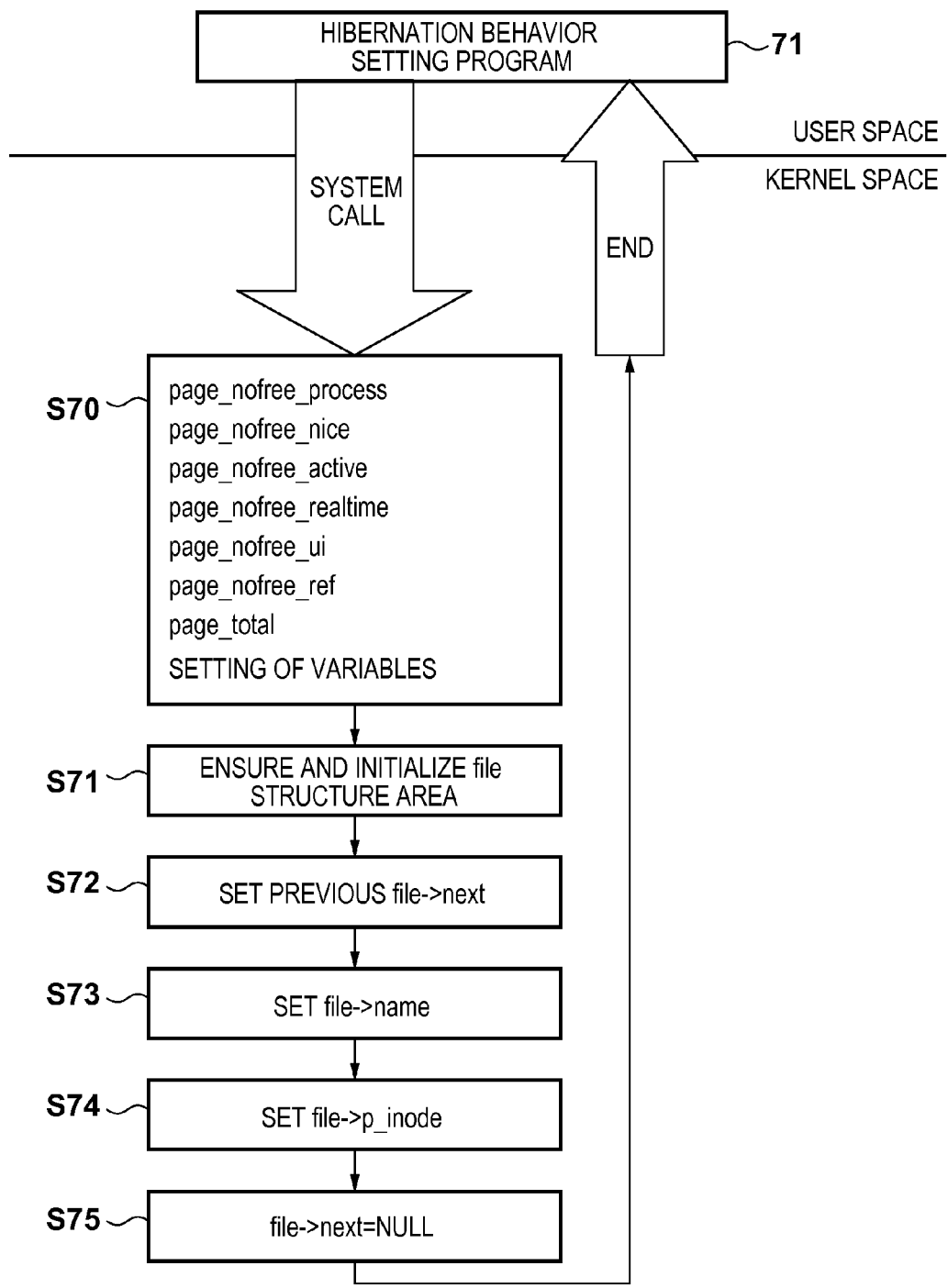
FIG. 13 is a view for explaining a process of setting flags and variables contained in the hibernation/page control information.

A process of setting flags and variables contained in the hibernation/page control information 63-1 will be explained with reference to FIG. 13. The hibernation/page control information 63-1 is set from a hibernation behavior setting program 71 in the user space or the like by using a system call or the like. By setting the hibernation/page control information 63-1 before acquiring the snapshot image 40, deallocation of a page in acquiring the snapshot image 40 changes. When no setting is made for the hibernation/page control information 63-1 (that is, the members of the hibernation/page control information 63-1 remain cleared to zero), this is regarded as designation of deallocating a page as much as possible.

Most members of the hibernation/page control information 63-1 are simple flags and numerical values, and it suffices to simply set values in the setting process based on a system call (S70). However, the OS needs to execute the following process for a member file.

The OS ensures and initializes a file structure (struct nofree_file) area (S71), and if a file has already been registered, allocates "1" to file→next and sets the area (S72). The OS stores, in file→name, the absolute path of the file that is notified by the system call (S73). Further, the OS acquires a pointer to the inode information 62-1 corresponding to the file via file management of the OS by using the notified absolute path, and stores the acquired pointer in file→p_inode (S74). The OS then sets file→next to NULL (S75).

By holding information about a file for which the page cache is not deallocated, whether to deallocate a page can be quickly determined in a file page determination process (FIG. 13) (to be described later).

Designation of Cache Non-Deallocation Process

Figure 14:
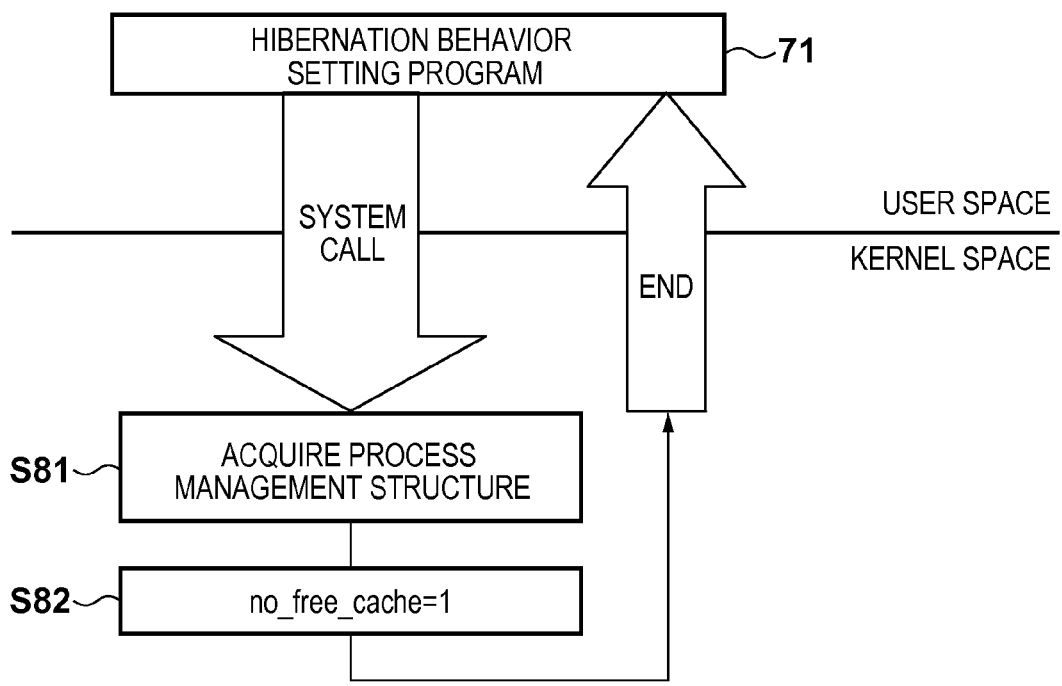
FIG. 14 is a view for explaining a process of designating not to deallocate a page cache belonging to a designated process in acquiring a snapshot image.

A process of designating not to deallocate a page cache belonging to a designated process in acquiring a snapshot image will be described with reference to FIG. 14. This designation process is not a process of changing flags and variables for controlling the cache of the whole system, as shown in FIG. 13, but a process-specific designation process. That is, when it is undesirable to deallocate the page cache of a given process, this designation process is executed in advance (before acquiring a snapshot image).

The hibernation behavior setting program 71 in the user space executes a system call by using, as an argument, the process ID of a process for which it is undesirable to deallocate the page cache. In response to this, the OS executes the following process.

The OS acquires the process management structure 61-1 of the process designated by the process ID (S81), and sets "1" in the member no_free_cache flag of the acquired process management structure 61-1 (S82). This explicitly indicates that a page belonging to the process is not to be deallocated in acquiring a snapshot image.

Snapshot Image Acquisition Process

Figure 15:
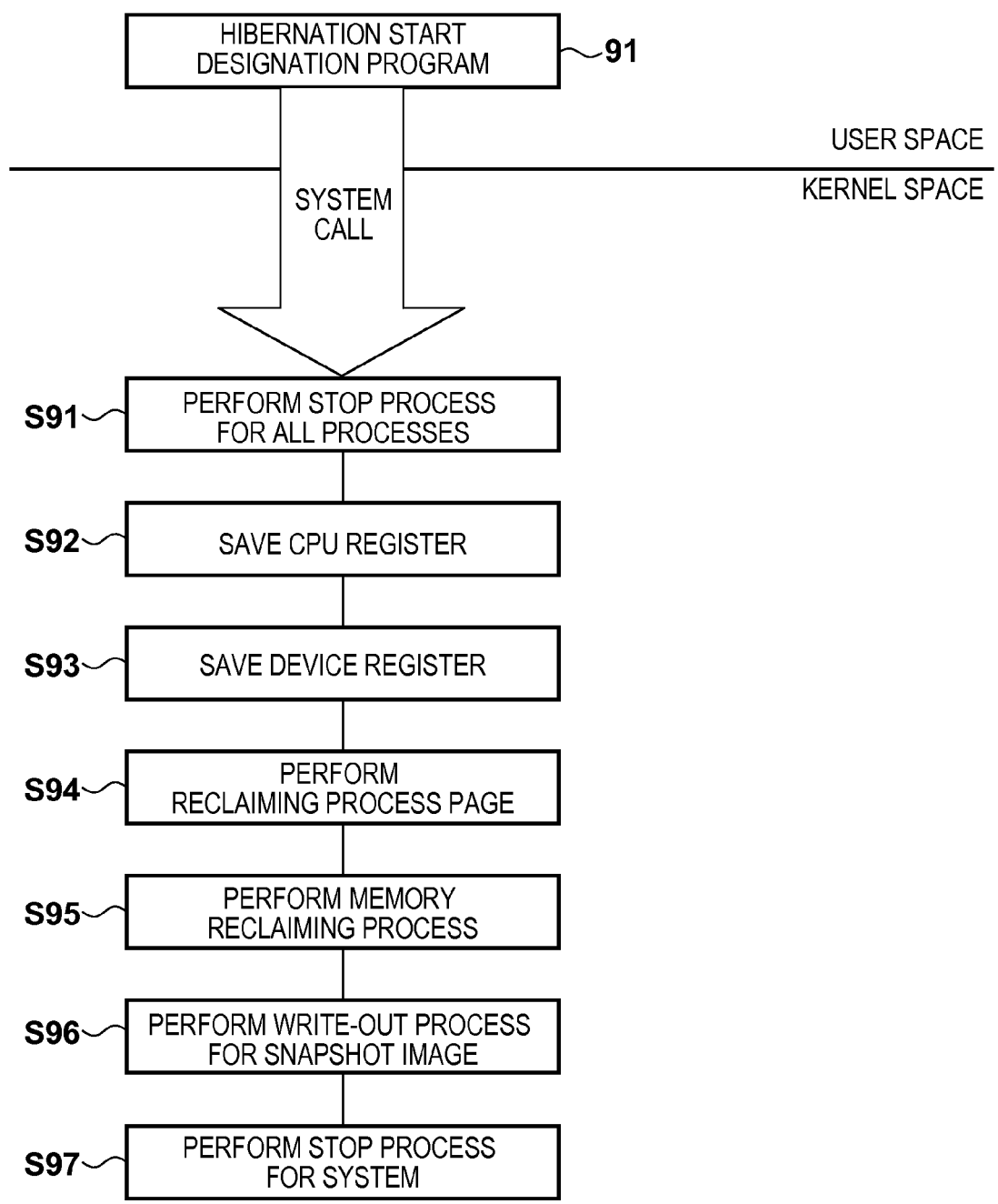
FIG. 15 is a view for explaining a snapshot image acquisition process.

A snapshot image acquisition process will be explained with reference to FIG. 15.

A hibernation start designation program 91 in the user space notifies the OS by a system call to start acquisition of a snapshot image. Upon receiving this notification, the OS executes the following process.

The OS stops all processes running in the system (S91) to prevent a change of the memory use state. Subsequently, the OS saves the set value of the CPU register at this time (S92), and saves the set value of the device register (S93). The OS deallocates the page, details of which will be described later (S94). Accordingly, an unnecessary cache is deallocated, reducing the data size of the snapshot image.

Then, the OS performs a memory reclaiming process (S95). The memory image of the use state can therefore be written out in a file as the snapshot image 40 in the format as shown in FIG. 4. The OS writes out the generated snapshot image 40 in the secondary storage device 13 (S96), and performs a stop process for the system (S97).

Hibernation Activation Process

Figure 16:
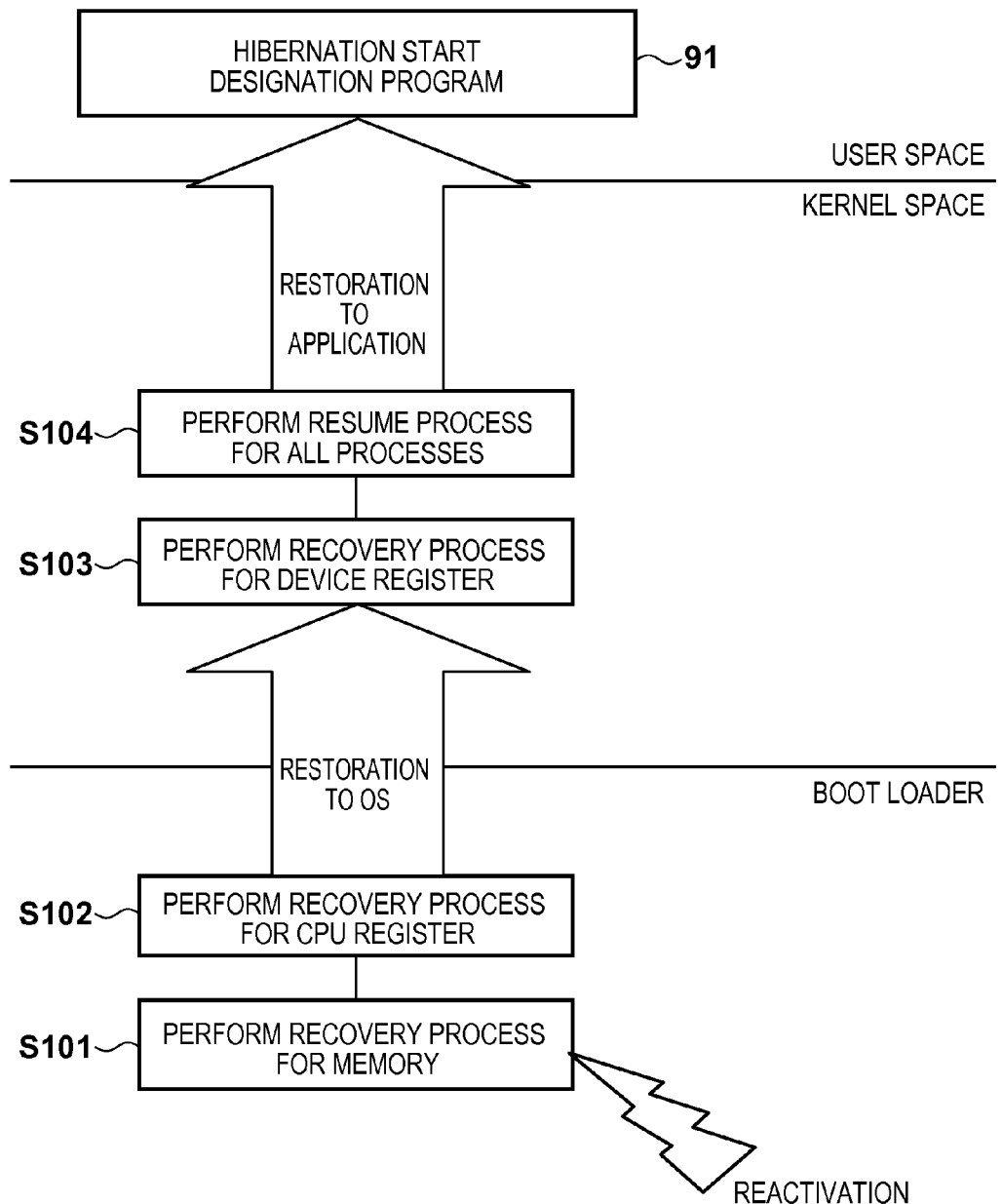
FIG. 16 is a view for explaining a hibernation activation process.

A hibernation activation process will be described with reference to FIG. 16.

When an activation button controller issues reset of the system, a boot loader is executed. The boot loader determines whether the snapshot image 40 shown in FIG. 7 has been stored in a predetermined area of the secondary storage device 13. This determination is made by checking the character string h_id in the header 41. If the boot loader determines that storage of the snapshot image 40 is not detected, it executes normal activation. If the boot loader determines that storage of the snapshot image 40 is detected, it performs the following process.

The boot loader performs a recovery process for the memory (S101). In this process, as shown in FIG. 7, the memory image is restored by DMA transfer while referring to the page metadata 43 and page data 44. After that, the boot loader performs a recovery process for the CPU register (S102).

After the end of the recovery process for the CPU register, restoration from the boot loader to the OS is implemented, and the OS performs the following process.

The OS performs a recovery process for the device register (S103), and performs a resume process for the process stopped in step S91 in the snapshot image acquisition process (S104). The OS returns from the system call issued by the hibernation start designation program 91 in the snapshot image acquisition process, and resumes execution of the application.

Deallocation of Page

The deallocation of a page (S94) will be explained with reference to the flowchart of FIG. 17. The deallocation of a page is a process which is invoked before executing the memory reclaiming process (S95), and deallocates an unnecessary cache to minimize the snapshot image 40.

First, the LRU list 63-4 shown in FIG. 9 is searched to extract the page management structure 63-3 of a process target (S111). Since the LRU list 63-4 is sorted in the order of access frequency, the process is performed for pages in ascending order of the access frequency. If the process has ended for all the pages registered in the LRU list 63-4 (S112), the deallocation of a page ends.

To specify a process holding the page from the extracted page management structure 63-3, it is determined whether the pointer p_process, contained in the page management structure 63-3, to the process management unit 61 to which the page belongs is NULL (S113). If the pointer p_process is NULL, it is determined that the page is not held by the process, and the process advances to step S118. If the pointer p_process is not NULL, a process page determination process (S114) is executed.

Details of the process page determination process (S114) will be detailed later. If the return value of the process page determination process is "1" (S115), this means to deallocate the page, and a page reclaiming process (S116) is executed. If the return value of the process page determination process is "0" (S115), this means not to deallocate the page, and the process advances to step S117 without executing the page reclaiming process.

If it is determined that the page is held by the process (p_process≠NULL) (S113), it is determined whether the pointer p_inode contained in the page management structure 63-3 is NULL (S118), in order to determine whether the page is used as a file cache. If the pointer p_inode is NULL, it is determined that this page is a page allocated by the OS for a special reason, and this page is not subjected to the page reclaiming process. The process returns to step S111 to extract the page management structure 63-3 of the next process target from the LRU list 63-4.

If the pointer p_inode (≠NULL) indicates the inode information 62-1, it is determined that the page is used for the file cache, and a file page determination process (S119) is executed.

Details of the file page determination process (S119) will be described later. If the return value of the file page determination process is "1" (S120), this means to deallocate the page, and the page reclaiming process (S116) is executed. If the return value of the file page determination process is "0" (S120), this means not to deallocate the page, and the process advances to step S117 without executing the page reclaiming process.

In step S116, a page reclaiming process prepared by the memory management unit of the OS is invoked. In the page reclaiming process, data of a designated page is written out, as needed, and then the page is deallocated as a free memory. For example, when the target page is a dirty page of a file cache, data of this page is written out to a corresponding position of the file, and then the page is deallocated. A clean page of the file cache is simply deallocated. If the target page is a dirty anonymous page, data of this page is written out to the swap, and then the page is deallocated. This process is a function provided by the memory management unit of the OS, and a detailed description thereof will be omitted. After the end of the page reclaiming process, the process advances to step S117.

In step S117, it is determined whether a necessary number of pages have been deallocated. If the value (cache amount) of a page cache to be left is set in a page_total variable serving as a member of the hibernation/page control information 63-1, the determination is made by comparison based on the set amount. That is, if the total number of pages registered in the LRU list 63-4 is larger than the value of the page_total variable, a page needs to be further deallocated. Thus, the process returns to step S111 to continue the deallocation of a page. If the total number of pages registered in the LRU list 63-4 is smaller than the value of the page_total variable, it is determined that the deallocation of necessary pages has ended, and the deallocation of a page ends.

If the value of the page_total variable is 0, it is determined that the value of a page cache to be left is undesignated. The process returns to step S111 to continue the deallocation of a page in order to deallocate all deallocatable pages registered in the LRU list 63-4.

Process Page Determination Process

Figure 18:
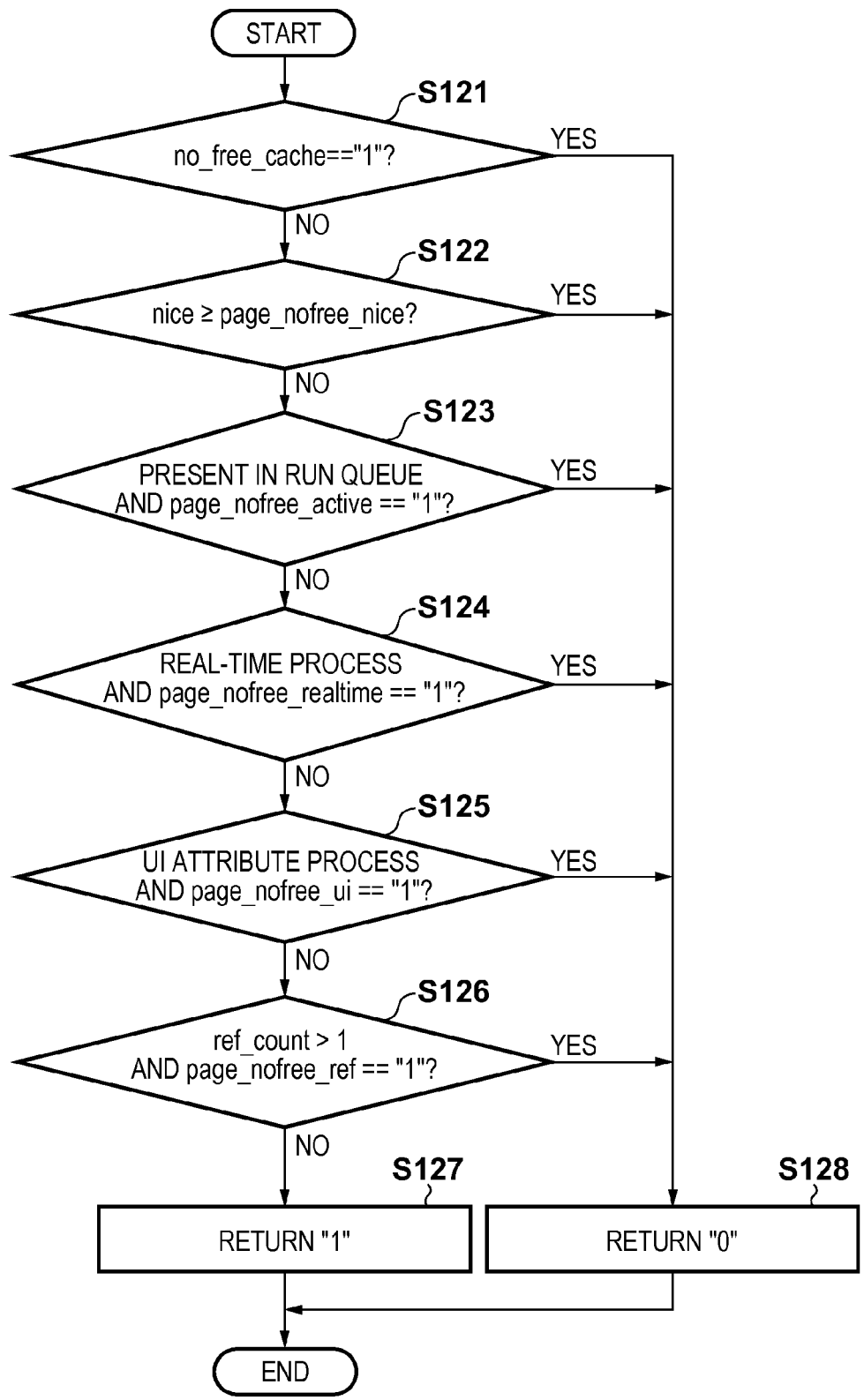
FIG. 18 is a flowchart for explaining a process page determination process.

The process page determination process (S114) will be explained with reference to the flowchart of FIG. 18.

Figure 17:
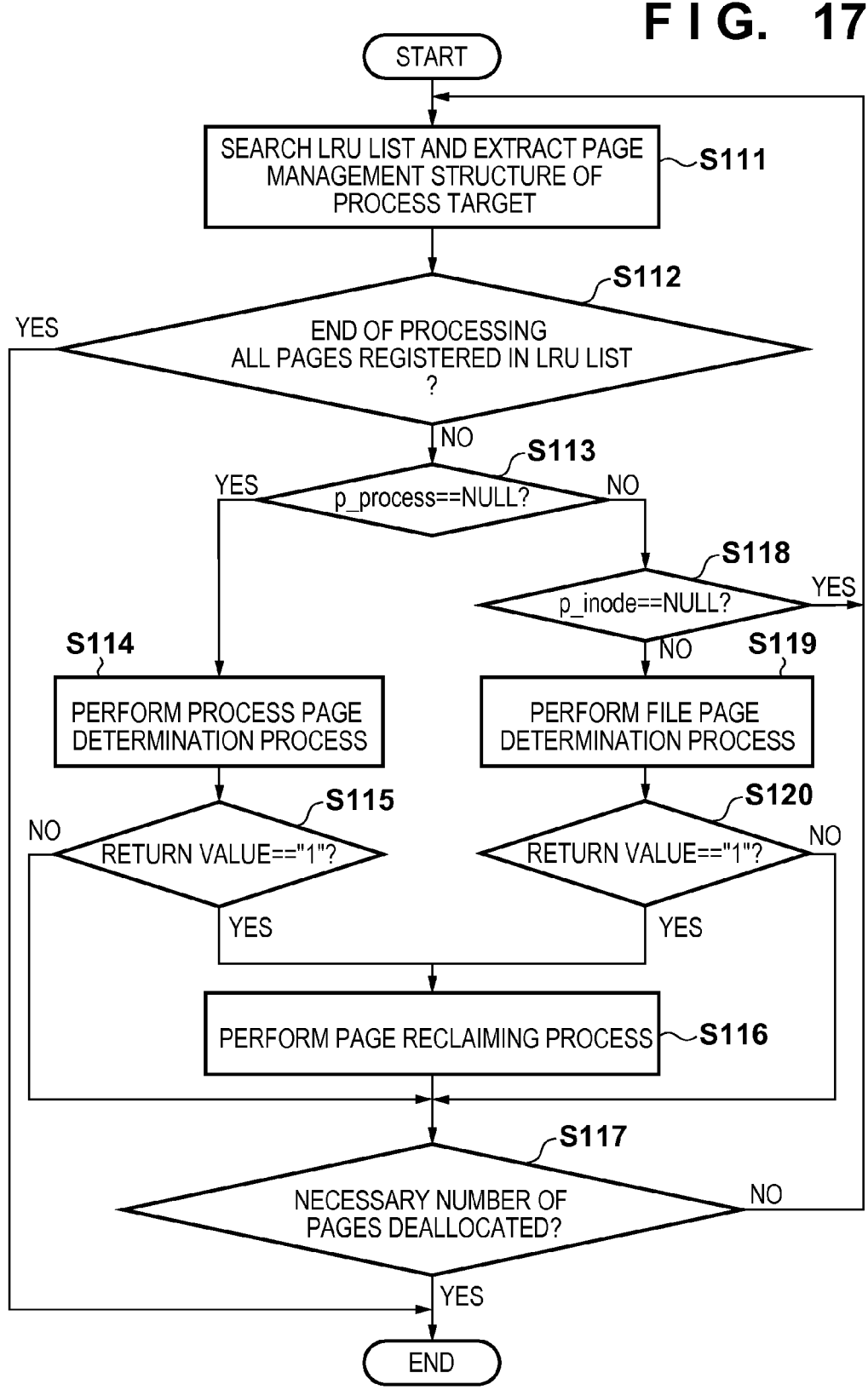
FIG. 17 is a flowchart for explaining deallocation of a page.

The process page determination process is invoked from the deallocation of a page shown in FIG. 17 to determine whether to deallocate the target page. The determination result is indicated by a return value "0" or "1". "0" is a determination result representing not to deallocate the target page, and "1" is a determination result representing to deallocate the target page.

First, whether the flag no_free_cache is set is determined by referring to the process management structure 61-1 of a process (to be referred to as a holding process hereinafter) holding the target page (S121). As described with reference to FIG. 14, it is designated not to deallocate a page belonging to a process for which the flag no_free_cache is set. Hence, if the flag no_free_cache is set (no_free_cache="1"), the determination result "0" representing not to deallocate the target page is sent back (S128), and the process ends.

The value of a member nice representing the priority of the process in the process management structure 61-1 (FIG. 10A) of the holding process is compared with the value of a member page_nofree_nice in the hibernation/page control information 63-1 (FIG. 12) (S122). As shown in FIG. 12, a page held by a process having a priority (nice value) equal to or higher than the page_nofree_nice value is not deallocated. That is, a page held by a process having a priority equal to or higher than a designated one is not deallocated. Thus, if the priority is equal to or higher than the page_nofree_nice value (nice≥page_nofree_nice), the determination result "0" representing not to deallocate the target page is sent back (S128), and the process ends.

Then, it is determined whether the holding process is registered in a RUN queue and whether a flag page_nofree_active in the hibernation/page control information 63-1 is set (S123). As shown in FIG. 12, when the flag page_nofree_active is set, a page held by a process waiting for execution (process registered in the RUN queue) is not deallocated. For this reason, if the holding process is registered in the RUN queue and page_nofree_active="1", the determination result "0" representing not to deallocate the target page is sent back (S128), and the process ends.

It is then determined whether the holding process is a real-time process and whether a flag page_nofree_realtime in the hibernation/page control information 63-1 is set (S124). As shown in FIG. 12, when the flag page_nofree_realtime is set, a page held by a real-time process is not deallocated. Therefore, if the holding process is a real-time process and page_nofree_realtime="1", the determination result "0" representing not to deallocate the target page is sent back (S128), and the process ends.

Thereafter, it is determined whether the holding process is a user interface (UI) attribute process and whether a flag page_nofree_ui in the hibernation/page control information 63-1 is set (S125). As shown in FIG. 12, when the flag page_nofree_ui is set, a page held by an interactive process is not deallocated. Thus, if the holding process is a UI attribute process and page_nofree_ui="1", the determination result "0" representing not to deallocate the target page is sent back (S128), and the process ends.

Whether the target page is referred to from a plurality of processes is determined by referring to the member ref_count in the page management structure 63-3 (FIG. 10C), and it is also determined whether a flag page_nofree_ref in the hibernation/page control information 63-1 is set (S126). As shown in FIG. 12, when the flag page_nofree_ref is set, a page (ref_count>1) referred to from a plurality of pages is not deallocated. Hence, if ref_count>1 and page_nofree_ref="1", the determination result "0" representing not to deallocate the target page is sent back (S128), and the process ends.

If NO in all the determinations of steps S121 to S126, the determination result "1" representing to deallocate the target page is sent back (S127), and the process ends.

File Page Determination Process

Figure 19:
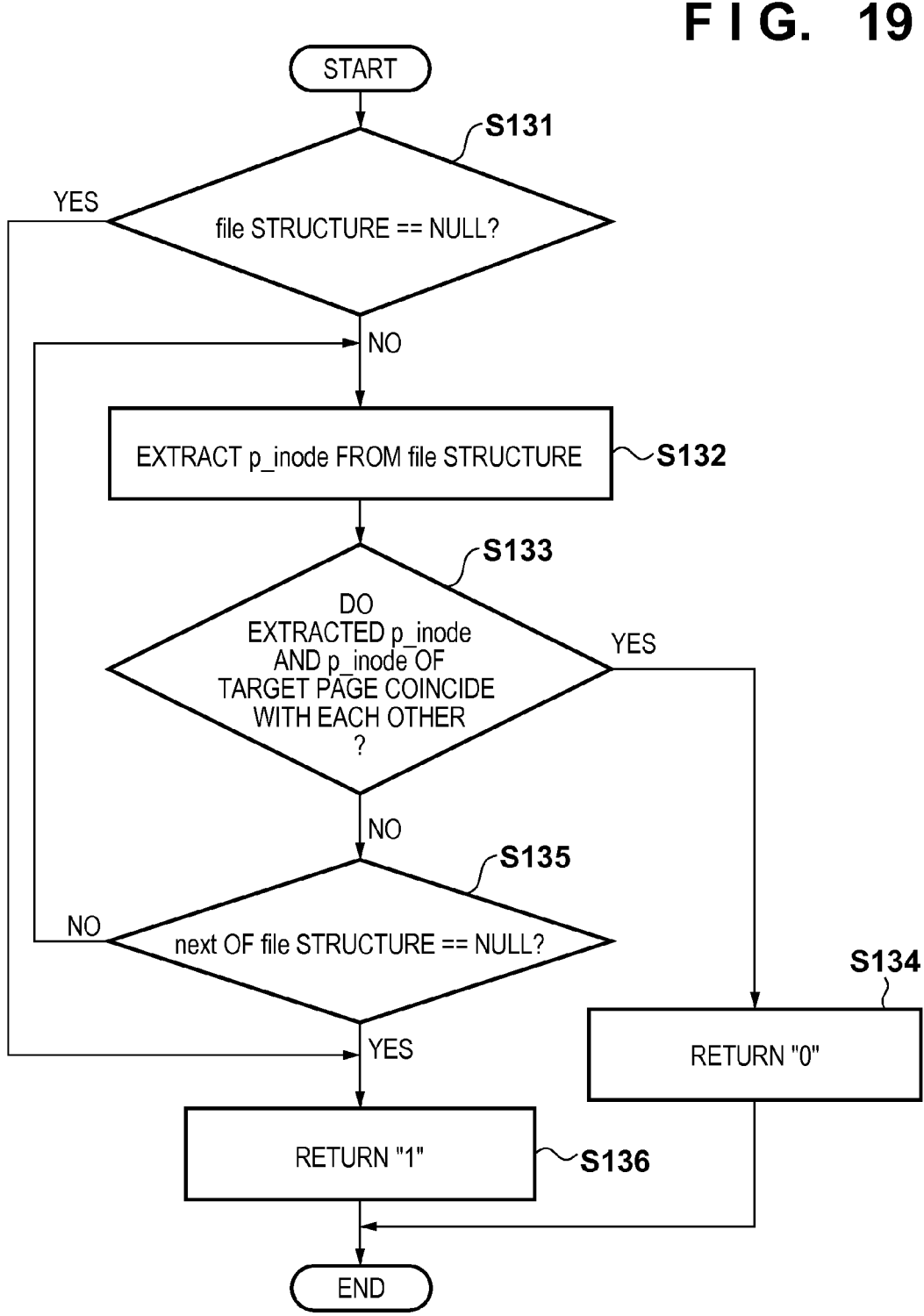
FIG. 19 is a flowchart for explaining a file page determination process.

The file page determination process (S119) will be explained with reference to the flowchart of FIG. 19.

The file page determination process is invoked from the deallocation of a page shown in FIG. 17 to determine whether to deallocate the target page. The determination result is indicated by a return value "0" or "1". "0" is a determination result representing not to deallocate the target page, and "1" is a determination result representing to deallocate the target page.

First, it is determined whether the file structure in the hibernation/page control information 63-1 (FIG. 12) is NULL (S131). If the file structure is not NULL, the pointer p_inode (see FIG. 11) to the inode information 62-1 is extracted from the start member of the file structure (S132). Then, it is determined whether the extracted pointer p_inode coincides with a pointer p_inode serving as a member of the page management structure 63-3 (FIG. 10C) of the target page (S133). If these two pointers coincide with each other, it is determined that the target page belongs to a file for which the page cache is not deallocated, the determination result "0" representing not to deallocate the target page is sent back (S134), and the process ends.

If these two pointers do not coincide with each other, whether next is NULL is determined by referring to a pointer next (see FIG. 11) to the next member of the file structure (S135). If next is not NULL, the process returns to step S132 to repeat the extraction (S132) of the pointer p_inode of the member indicated by the pointer next and the determination (S133) regarding the pointer p_inode.

If it is determined in step S131 that the file structure is NULL, or if the pointer next of the file structure becomes NULL while the pointers remain different from each other, it is determined that the target page belongs to a file for which the page cache is not deallocated. Then, the determination result "1" representing to deallocate the target page is sent back (S136), and the process ends.

As described above, whether to deallocate a page is determined in accordance with information which is set in the hibernation/page control information 63-1 and controls deallocation of a page. Based on the settings of the hibernation/page control information 63-1, deallocation of a page is controlled to deallocate a page which is less likely to decrease the throughput after reactivation, without deallocating a page which is highly likely to decrease the throughput after reactivation. As a result, the data size of a snapshot image can be reduced to speed up reactivation, and a decrease in throughput after reactivation can be suppressed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-237274, filed Oct. 26, 2012, which is hereby incorporated by reference herein in its entirety.

What is claimed is:

1. An information processing apparatus comprising:
a saving unit configured to save, in a secondary storage device, data representing a storage state of a main memory of an information processing device;
a recovery unit configured to transfer the data saved in the secondary storage device to the main memory in reactivation of the information processing device to restore the storage state of the main memory; and
a deallocation unit configured to deallocate a cache allocated in the main memory before generating data to be saved by the saving unit.

2. The apparatus according to claim 1, further comprising a designation unit configured to designate a cache not to be deallocated, wherein the deallocation unit does not deallocate the designated cache.

3. The apparatus according to claim 2, wherein in accordance with designation of a process by the designation unit, a cache held by the process is designated as the cache not to be deallocated.

4. The apparatus according to claim 2, wherein in accordance with designation of a priority by the designation unit, a cache held by a process having a priority not smaller than the priority is designated as the cache not to be deallocated.

5. The apparatus according to claim 2, wherein in accordance with designation by the designation unit, a cache held by a process waiting for execution is designated as the cache not to be deallocated.

6. The apparatus according to claim 2, wherein in accordance with designation by the designation unit, a cache held by a real-time process is designated as the cache not to be deallocated.

7. The apparatus according to claim 2, wherein in accordance with designation by the designation unit, a cache held by a process associated with a user interface is designated as the cache not to be deallocated.

8. The apparatus according to claim 2, wherein in accordance with designation by the designation unit, a cache referred to from a plurality of processes is designated as the cache not to be deallocated.

9. The apparatus according to claim 2, wherein in accordance with designation of a file by the designation unit, a cache associated with the file is designated as the cache not to be deallocated.

10. The apparatus according to claim 2, wherein when the designation unit designates a cache amount not to be deallocated, the deallocation unit deallocates caches up to the cache amount in ascending order of access frequency.

11. The apparatus according to claim 1, wherein the data to be saved comprises register information of a register of a microprocessor of the information processing device, and register information of a hardware register of the information processing device.

12. The apparatus according to claim 2, wherein the deallocation unit swaps out, to the secondary storage device, a dirty page allocated in the main memory as a shared memory or anonymous memory, excluding a page corresponding to the cache not to be deallocated, and then deallocates the dirty page.

13. The apparatus according to claim 2, wherein the deallocation unit deallocates a clean page allocated in the main memory as a file cache, excluding a page corresponding to the cache not to be deallocated.

14. The apparatus according to claim 1, wherein the deallocation unit does not deallocate a page corresponding to an index node (inode) pointer which is contained in a page management structure of an operating system of the information processing device and has a value NULL.

15. The apparatus according to claim 1, wherein the main memory is volatile and the secondary storage device is non-volatile.

16. An information processing method comprising:
using a processor to perform the steps of:
saving, in a secondary storage device, data representing a storage state of a main memory of an information processing device;
transferring the data saved in the secondary storage device to the main memory in reactivation of the information processing device to restore the storage state of the main memory; and
performing deallocation of a cache allocated in the main memory before generating data to be saved in the saving step.

17. A non-transitory computer readable medium storing a computer-executable program for causing a computer to perform the information processing method according to claim 16.

* * * * *